(12) United States Patent
Leech et al.

(10) Patent No.: US 7,336,485 B2
(45) Date of Patent: Feb. 26, 2008

(54) HEAT SINK DETECTION

(75) Inventors: Phillip A. Leech, Houston, TX (US); Kenneth B. Frame, Spring, TX (US); Khaldoun Alzien, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 120 days.

(21) Appl. No.: 11/263,271

(22) Filed: Oct. 31, 2005

(65) Prior Publication Data

US 2007/0097622 A1    May 3, 2007

(51) Int. Cl.
*G06F 1/20* (2006.01)
(52) U.S. Cl. .................. 361/687; 361/690; 713/320
(58) Field of Classification Search ............ 324/158.1; 713/300, 320; 702/30; 361/690, 810, 679–687, 361/724–727
See application file for complete search history.

(56) References Cited

U.S. PATENT DOCUMENTS

| 6,462,948 | B1 | 10/2002 | Leija |
| 6,518,661 | B1 | 2/2003 | Blish |
| 6,529,062 | B2 | 3/2003 | Majumdar |
| 6,618,252 | B2 | 9/2003 | Choi |
| 6,728,104 | B1 | 4/2004 | Ahmad |
| 6,893,902 | B2 | 5/2005 | Cordes |
| 2005/0094374 | A1* | 5/2005 | Kenny et al. ............... 361/699 |
| 2005/0099172 | A1* | 5/2005 | Durham et al. .......... 324/158.1 |
| 2005/0122691 | A1 | 6/2005 | Crippen |
| 2005/0217293 | A1 | 10/2005 | Lee |
| 2007/0035937 | A1* | 2/2007 | Colbert et al. .............. 361/810 |

* cited by examiner

*Primary Examiner*—Hung Van Duong

(57) ABSTRACT

In one embodiment, a printed circuit board assembly comprises a heat sink having an electrically conductive mounting support and a printed circuit board including detection circuitry to detect an electrical connection between the electrically conductive mounting support and an electrically conductive receiver on the printed circuit board.

19 Claims, 3 Drawing Sheets

HEAT SINK DETECTION

TECHNICAL FIELD

This application relates to electronic computing and more particularly to heat sink detection.

BACKGROUND

Computing devices such as personal computers (PCs) typically include one or more printed circuit boards (PCBs) on which various components are mounted to form printed circuit assemblies (PCAs). Such components include those that generate heat during their operation. One type of component that often generates large quantities of heat is a microchip, such as a microprocessor.

Due to the great heat generated by some components, heat sinks are sometimes employed to remove heat from the components and transfer that heat to the ambient air that surrounds the components. For example, it is common to mount heat sinks to microprocessors to transfer heat generated by the microprocessors during their operation. In some cases, a manufacturing error that results in the absence of such a heat sink can cause operational errors to occur due to overheating of the component. Therefore, it may be important to ensure that a given heat sink is present.

Due to the importance of such heat sinks, it is useful to inspect a computing device during manufacturing to verify that the heat sink(s) of the device is/are present.

SUMMARY

In one embodiment, a printed circuit board assembly comprises a heat sink having an electrically conductive mounting support; and a printed circuit board including detection circuitry to detect an electrical connection between the electrically conductive mounting support and an electrically conductive receiver on the printed circuit board.

DETAILED DESCRIPTION

Disclosed are systems and methods for determining whether a heat sink is installed so that overheating of a heat-producing component of a computing device can be avoided. As is described in the following, the systems and methods, at least in some embodiments, employ a heat sink detection circuit that is in electrical communication with detection circuitry on the printed circuit board. The detection circuitry generates a first logic value when the heat sink is in electrical communication with the detection circuitry, and a second logic value when electrical communication with the detection circuitry is broken.

Figure 1:
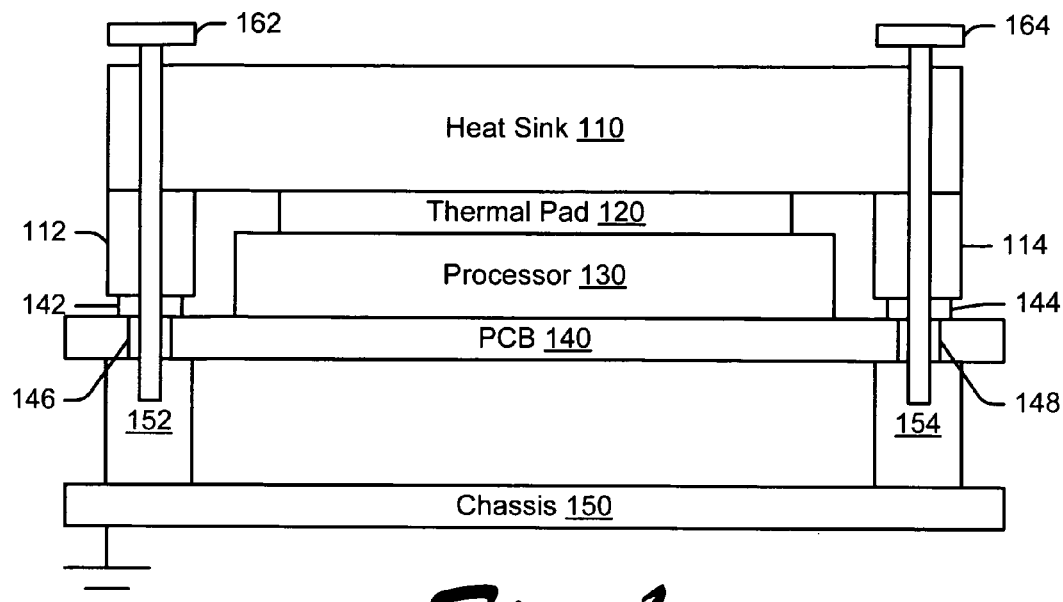
FIG. 1 is a schematic depiction of a circuit board assembly including a heat sink.

FIG. 1 is a schematic depiction of one embodiment of a circuit board assembly 100 including a heat sink. Referring to FIG. 1, circuit board assembly 100 comprises a printed circuit board (PCB) 140 mounted to an underlying chassis 150. Chassis 150 may include one or more mounting brackets 152, 154, also referred to as standoffs, to which the PCB 140 may be connected.

PCB 140 may include a plurality of components such as, e.g., processors, memory, etc., connected by circuit traces on the PCB 140. In one embodiment, PCB 140 may include a heat generating component such as processor 130 mounted to the surface of PCB 140.

Circuit board assembly 100 may further include a heat sink 110 mounted to the surface of PCB 140. In one embodiment, heat sink 110 may include supports 112, 114 which mount to the PCB 140 and support heat sink 110. Supports 112, 114 may be integrally formed with heat sink 110 or may be formed separately. Heat sink 110 is mounted to PCB in thermal communication with a heat-generating component such as processor 130 such that heat generated by processor 130 may be transferred from the processor 130 to the heat sink 110, which dissipates the heat. In one embodiment, a thermal pad 120 formed from a material that does not conduct electricity may be interposed between processor 130 and heat sink 110. In alternate embodiments, heat sink 110 may be in direct physical contact with processor 130.

In one embodiment, heat sink 110 may be mounted to PCB 140 using conventional fasteners such as, for example, screws 162, 164 that extend through an aperture in heat sink 110 and supports 112, 114. PCB 140 may include apertures 146, 148 (FIG. 2) to received screws 162, 164. Further, standoffs 152, 154 may include apertures to receive screws 162, 164. When the PCB assembly 100 is assembled, torque is applied to screws 162, 164, which applies a compressive force to heat sink 110, thermal pad 120, processor 130 and PCB 140, thereby securing the assembly 100.

In one embodiment, components of PCB assembly 100 are formed from materials that permit the components to function as elements of a heat sink detection system. In this regard, heat sink 110, supports 112, 114, standoffs 152, 154, chassis 150, and fasteners 162, 164 may include a material that conducts electricity such as, for example, aluminum, copper, or another suitable conductor. As illustrated in FIG. 1, chassis 150 may be connected to an electrical ground.

Figure 2:
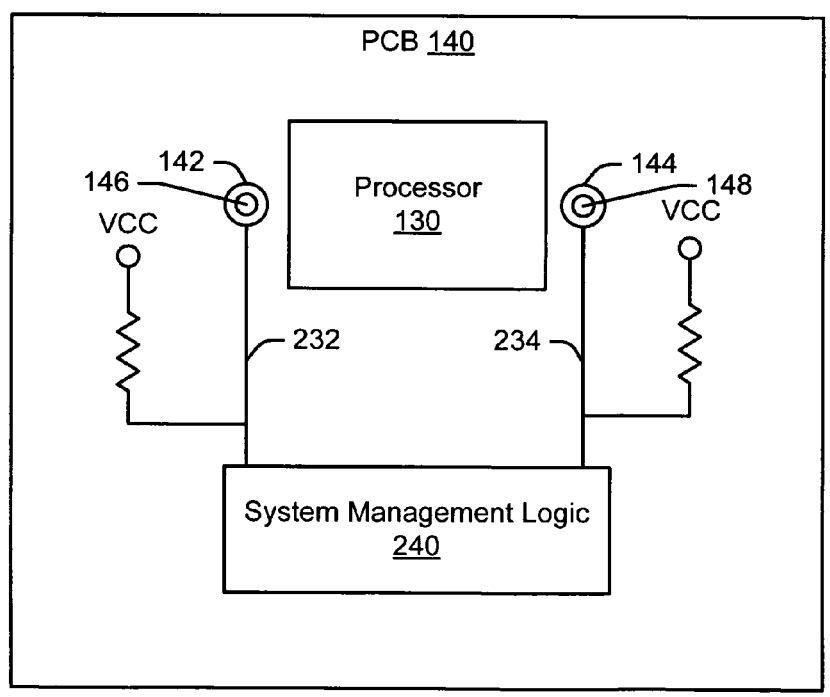
FIG. 2 is a schematic illustration of one embodiment of a printed circuit board adapted to detect a heat sink.

FIG. 2 is a schematic illustration of one embodiment of a printed circuit board 140 adapted to detect a heat sink. In one embodiment, PCB 140 comprises a processor 130. PCB 140 further comprises a first aperture 146 and a second aperture 148 proximate processor socket 220 to receive respective fasteners 162, 164. A first electrical contact 142 is positioned adjacent the first aperture 146, and a second electrical contact 144 is positioned adjacent the second aperture 148. In the embodiment depicted in FIG. 2, electrical contacts 142, 144 may be embodied as circuit traces that form annular rings circumscribing the respective apertures 146, 148. However, the particular shape of electrical contacts 142, 144 is not critical. In alternate embodiments, electrical contacts 142, 144 may be point contacts, or may circumscribe only a portion of apertures 146, 148. Further, although the embodiment depicted in FIG. 2 includes two separate electrical contacts, in alternate embodiments a single electrical contact adjacent one of the apertures 146, 148 may be used.

Electrical contact 142 is coupled to a source voltage (VCC) via circuit trace 232, which is, in turn, coupled to a system management logic module 240. Similarly, electrical contact 144 is coupled to a source voltage (VCC) via circuit trace 234, which is, in turn, coupled to system management logic module 240. In one embodiment, system management logic module 240 may be embodied as a combination of hardware and logic instruction that receive the voltage levels on traces 232, 234 as inputs. The particular source voltage level VCC is not critical.

In the absence of a heat sink, circuit traces 232, 234 will present a voltage level corresponding to VCC as inputs to system management logic 240. However, when a heat sink assembly as depicted in FIG. 1 is mounted to PCB 140, electrical path from circuit traces 232, 234 to ground is established via contacts 142, 144, supports 112, 114, fasteners 162, 164, standoffs 152, 154, and chassis 150. Hence, securing the heat sink to the PCB 140 causes the voltage at circuit traces to drop to ground. System management logic 240 detects the voltage drop on circuit traces 232, 234.

Figure 3:
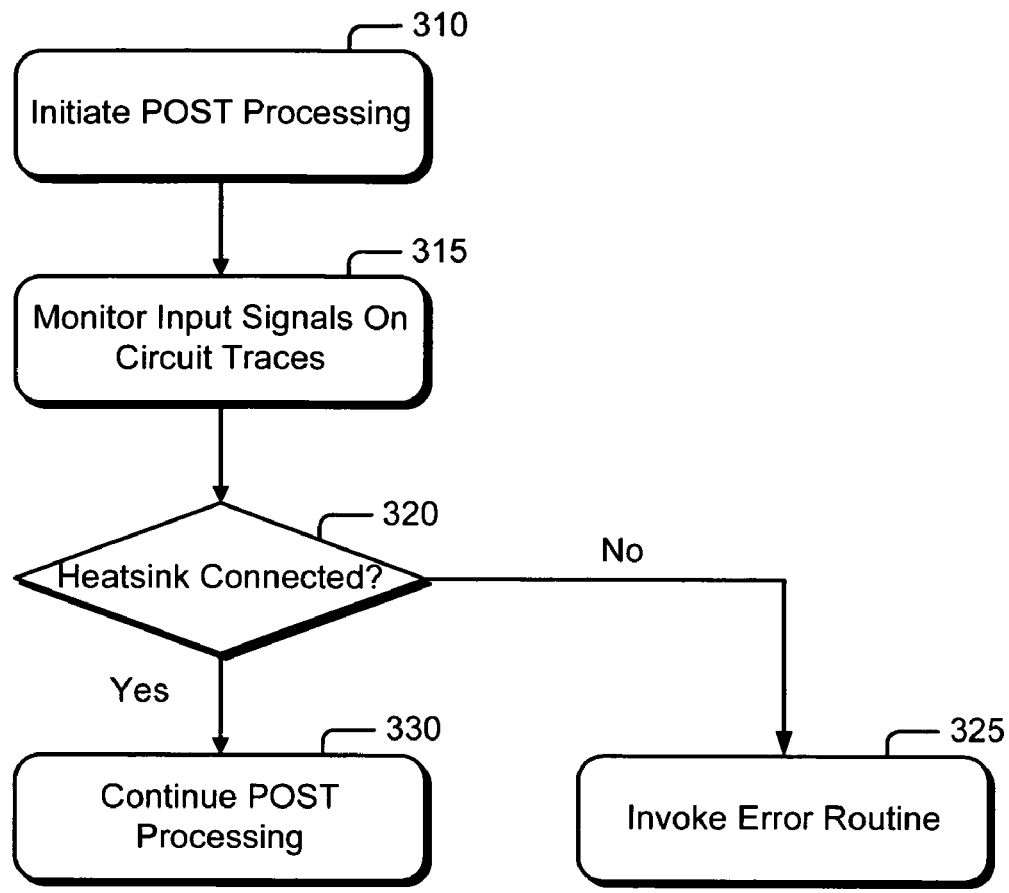
FIG. 3 is a flowchart illustrating operations in one embodiment of a method of operating a computing system.

System management logic 240 may include logic instructions executable on a processor to interpret the signals presented on circuit traces 232, 234 to detect the presence or absence of a heat sink. In one embodiment, the logic instructions may be incorporated into the basic input/output system (BIOS) of a computing device. FIG. 3 is a flowchart illustrating operations in one embodiment of a heat sink detection routine.

Referring to FIG. 3, at operation 310, the system BIOS initiates power on self test (POST) processing. At operation 315 the input signals on circuit traces 232, 234 are monitored. If, at operation 320 the BIOS detects that a heat sink is connected (i.e., if the inputs on circuit traces 232, 234 correspond to ground), then control passes to operation 330 and POST processing may continue in accord with normal operations. By contrast, if at operation the BIOS detects that a heat sink is not connected (i.e., if the inputs on circuit traces 232, 234 correspond to the source voltage), then control passes to operation 325 and an error routine may be invoked.

In on embodiment an error routine may comprise generating a signal that indicates a heat sink is not properly attached to the PCB 140. In addition, the error routine may comprise generating an audible error alarm or a displaying a visible indicator on a display.

Figure 4:
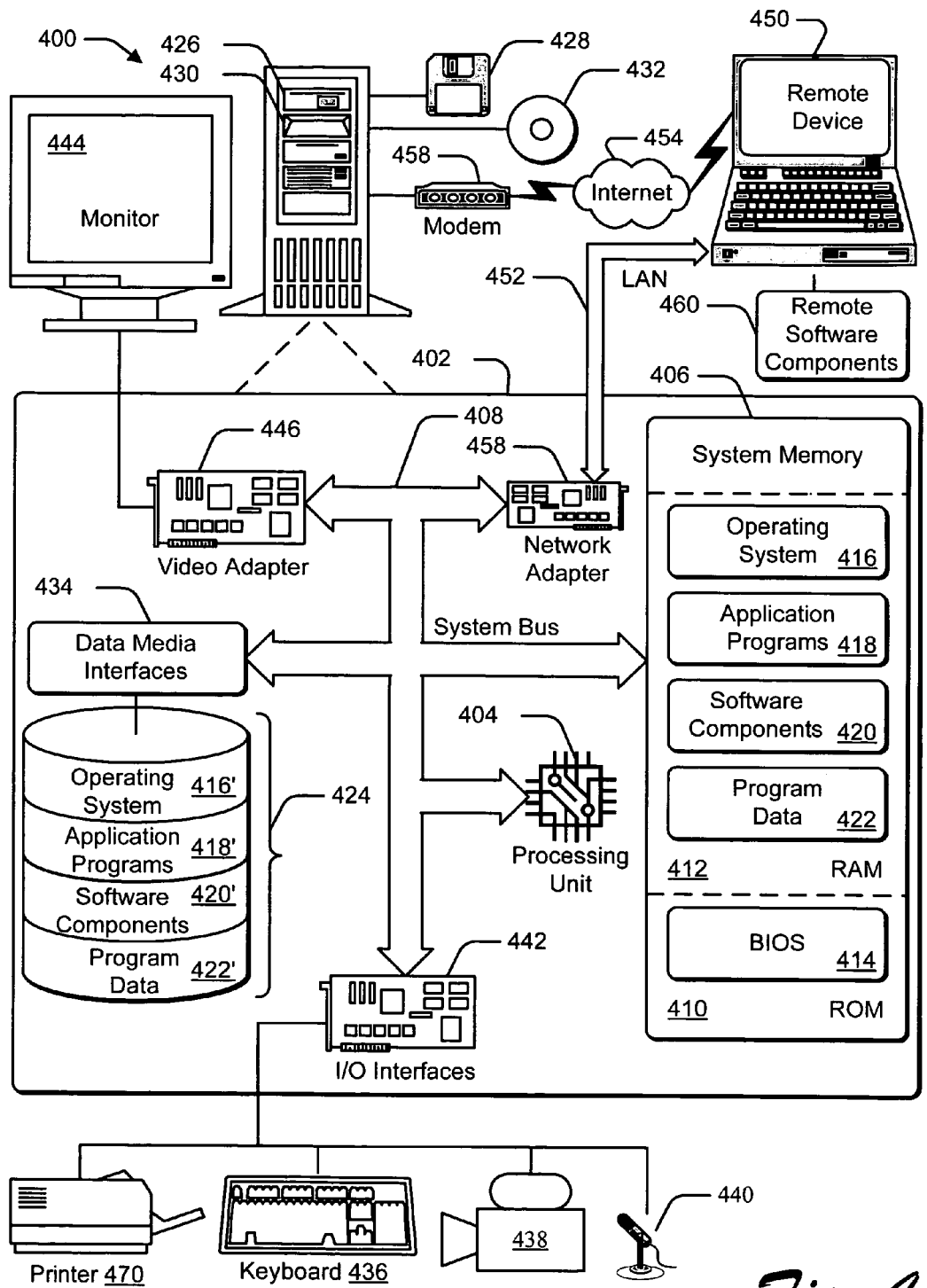
FIG. 4 is a schematic illustration of a computing environment in accordance with an embodiment.

In one embodiment, the PCB assembly 100 depicted in FIGS. 1-2 may be incorporated into a computing system. FIG. 4 shows components of typical example of such a computer, referred by to reference numeral 400. The components shown in FIG. 4 are only examples, and are not intended to suggest any limitation as to the scope of the functionality of the invention; the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 404, a system memory 406, and a system bus 408 that couples various system components including the system memory 406 to the processing unit 404. The system bus 408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media The system memory 406 includes computer storage media in the form of volatile and/or nonvolatile memory such as read only memory (ROM) 410 and random access memory (RAM) 412. A basic input/output system 414 (BIOS), containing the basic routines that help to transfer information between elements within computer 400, such as during start-up, is typically stored in ROM 410. RAM 412 typically contains data and/or program modules that are immediately accessible to and/or presently being operated on by processing unit 404. By way of example, and not limitation, FIG. 4 illustrates operating system 416, application programs 418, other software components 420, and program data 422.

The computer 400 may also include other removable/non-removable, volatile/nonvolatile computer storage media. By way of example only, the computer system of FIG. 4 may include a hard disk drive 424 that reads from or writes to non-removable, nonvolatile magnetic media, a magnetic disk drive 426 that reads from or writes to a removable, nonvolatile magnetic disk 428, and an optical disk drive 430 that reads from or writes to a removable, nonvolatile optical disk 432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 424 is typically connected to the system bus 408 through a non-removable memory interface such as data media interface 434, and magnetic disk drive 426 and optical disk drive 430 are typically connected to the system bus 408 by a removable memory interface.

The drives and their associated computer storage media discussed above and illustrated in FIG. 4 provide storage of computer-readable instructions, data structures, program modules, and other data for computer 400. In FIG. 4, for example, hard disk drive 424 is illustrated as storing operating system 416', application programs 418', software components 420', and program data 422'. Note that these components can either be the same as or different from operating system 416, application programs 418, software components 420, and program data 422. Operating system 416, application programs 418, other program modules 420, and program data 422 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone 440, joystick, game pad, satellite dish, scanner, or the like. These and other input devices are often connected to the processing unit 404 through an input/output (I/O) interface 442 that is coupled to the system bus, but may be connected by other interface and bus structures, such as a parallel port, game port, or a universal serial bus (USB). A monitor 444 or other type of display device is also connected to the system bus 406 via an interface, such as a video adapter 446. In addition to the monitor 444, computers may also include other peripheral output devices (e.g., speakers) and one or more printers 470, which may be connected through the I/O interface 442.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454.

Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 442, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least one implementation. The appearances of the phrase "in one embodiment" in various places in the specification are not necessarily all referring to the same embodiment.

What is claimed is:

1. A printed circuit board assembly, comprising:
   a heat sink having an electrically conductive mounting support; and
   a printed circuit board including detection circuitry to detect an electrical connection between the electrically conductive mounting support and an electrically conductive receiver on the printed circuit board, wherein the printed circuit board includes:
   a first aperture to receive a first fastener to mount the heat sink to the printed circuit board; and
   an electrical contact adjacent the first aperture.

2. The printed circuit board assembly of claim 1, wherein the electrical contact comprises an annular ring surrounding the first aperture.

3. The printed circuit board assembly of claim 1, wherein the printed circuit board includes:

a second aperture to receive a second fastener to mount the heat sink to the printed circuit board; and an electrical contact adjacent the second aperture.

4. The printed circuit board assembly of claim 3, wherein the electrical contact comprises an annular ring surrounding the second aperture.

5. The printed circuit board assembly of claim 1, wherein the detection circuitry includes:

a first connection to a source voltage; and a second connection to the electrically conductive receiver on the printed circuit board.

6. The printed circuit board assembly of claim 1, wherein the detection circuitry includes:

a third connection to a source voltage; and a fourth connection to the electrically conductive receiver on the printed circuit board.

7. The printed circuit board assembly of claim 1, wherein connecting the heat sink to the printed circuit board establishes an electrical connection between the electrically conductive receiver on the printed circuit board and a ground voltage.

8. The printed circuit board assembly of claim 1, further comprising:

a logic module to receive a signal generated by the detection circuitry.

9. A computer system, comprising:

a printed circuit board assembly including a processor and memory module; and a heat sink having an electrically conductive mounting support;

wherein the printed circuit board includes detection circuitry to detect an electrical connection between the electrically conductive mounting support and an electrically conductive receiver on the printed circuit board, wherein the printed circuit board includes:

a first aperture to receive a first fastener to mount the heat sink to the printed circuit board; and an electrical contact adjacent the first aperture.

10. The computer system of claim 9, wherein the electrical contact comprises an annular ring surrounding the first aperture.

11. The computer system of claim 9, wherein the printed circuit board includes:

a second aperture to receive a second fastener to mount the heat sink to the printed circuit board; and an electrical contact adjacent the second aperture.

12. The computer system of claim 11, wherein the electrical contact comprises an annular ring surrounding the second aperture.

13. The computer system of claim 9, wherein the detection circuitry includes:

a first connection to a source voltage; and a second connection to the electrically conductive receiver on the printed circuit board.

14. The computer system of claim 13, wherein the detection circuitry includes:

a third connection to a source voltage; and a fourth connection to the electrically conductive receiver on the printed circuit board.

15. The computer system of claim 9, wherein connecting the heat sink to the printed circuit board establishes an electrical connection between the electrically conductive receiver on the printed circuit board and a ground voltage.

16. The computer system of claim 9, further comprising:

a logic module to receive a signal generated by the detection circuitry.

17. A computer system, comprising:

a printed circuit board assembly including a processor and memory module; and a heat sink having an electrically conductive mounting support;

wherein the printed circuit board includes detection circuitry to detect an electrical connection between the electrically conductive mounting support and an electrically conductive receiver on the printed circuit board, wherein the detection circuitry includes:

a first connection to a source voltage; and a second connection to the electrically conductive receiver on the printed circuit board;

a third connection to a source voltage; and a fourth connection to the electrically conductive receiver on the printed circuit board.

18. The computer system of claim 17, wherein connecting the heat sink to the printed circuit board establishes an electrical connection between the electrically conductive receiver on the printed circuit board and a ground voltage.

19. The computer system of claim 17, further comprising:

a logic module to receive a signal generated by the detection circuitry.

* * * * *